US010260967B2

(12) United States Patent
Jang et al.

(10) Patent No.: US 10,260,967 B2
(45) Date of Patent: Apr. 16, 2019

(54) INSULATED GATE BIPOLAR TRANSISTOR (IGBT) TEMPERATURE SENSE CIRCUIT FOR AUTOMATICALLY CALIBRATING TEMPERATURE SENSE OF DIODE

(71) Applicant: Hyundai Motor Company, Seoul (KR)

(72) Inventors: Ji Woong Jang, Gyeonggi-do (KR); Ki Jong Lee, Gyeonggi-do (KR); Kang Ho Jeong, Gyeongsangnam-do (KR); Ki Young Jang, Incheon (KR); Sang Cheol Shin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 281 days.

(21) Appl. No.: 15/270,524

(22) Filed: Sep. 20, 2016

(65) Prior Publication Data

US 2018/0003574 A1  Jan. 4, 2018

(30) Foreign Application Priority Data

Jun. 30, 2016  (KR) ........................ 10-2016-0082873

(51) Int. Cl.
*G01K 15/00* (2006.01)
*G01K 7/01* (2006.01)
(52) U.S. Cl.
CPC ............. *G01K 15/005* (2013.01); *G01K 7/01* (2013.01)
(58) Field of Classification Search
CPC ............................... G01K 7/01; G01K 15/005
See application file for complete search history.

(56) References Cited

U.S. PATENT DOCUMENTS

| 5,781,075 A * | 7/1998 | Bolton, Jr. ............... H03L 1/02 327/513 |
| 6,342,997 B1 * | 1/2002 | Khadkikar ............. G01K 3/005 361/100 |
| 7,089,146 B1 * | 8/2006 | D'Aquino ............... G01K 7/01 257/467 |
| 2004/0071189 A1 * | 4/2004 | Tanaka .................... G01K 7/01 374/183 |
| 2005/0099751 A1 | 5/2005 | Kumagai |

(Continued)

FOREIGN PATENT DOCUMENTS

| CA | 2260477 A1 * | 8/1999 | ............... G01K 7/01 |
| JP | 2010-136472 A | 6/2010 | |
| JP | 2011-010480 A | 1/2011 | |

(Continued)

*Primary Examiner* — Randy W Gibson
(74) *Attorney, Agent, or Firm* — Mintz Levin Cohn Ferris Glovsky and Popeo, P.C.; Peter F. Corless

(57) ABSTRACT

An IGBT temperature sense circuit is provided. The IGBT temperature sense circuit automatically calibrates a temperature sense of a diode to minimize an error based on element characteristics of a temperature sense diode, precisely senses the temperature and removes a limit of a maximum current (to increase the maximum current) of an output of an IGBT. A temperature sense circuit includes an automatic calibrator that is configured to supply current of a current source to a current to a diode and a diode temperature sensor that is configured to measure a voltage of one side terminal of the diode based on the current of the diode based on a change of a temperature and adjustment of an operation of a protection object device.

12 Claims, 9 Drawing Sheets

(56) References Cited

U.S. PATENT DOCUMENTS

2005/0178372 A1\* 8/2005 Kesler ................... F02P 3/055
                                                                                      123/630
2016/0084717 A1 3/2016 Jeong et al.

FOREIGN PATENT DOCUMENTS

| KR | 10-1015049 B1 | 2/2011 |
| KR | 10-2016-0034588 A | 3/2016 |

\* cited by examiner

INSULATED GATE BIPOLAR TRANSISTOR (IGBT) TEMPERATURE SENSE CIRCUIT FOR AUTOMATICALLY CALIBRATING TEMPERATURE SENSE OF DIODE

CROSS-REFERENCE TO RELATED APPLICATION

This application is based on and claims the benefit of priority to Korean Patent Application No. 10-2016-0082873, filed on Jun. 30, 2016 in the Korean Intellectual Property Office, the disclosure of which is incorporated herein in its entirety by reference.

BACKGROUND

Field of the Invention

The present disclosure relates to an insulated gate bipolar transistor (IGBT) temperature sense circuit, and more particularly, to an IGBT temperature sense circuit capable of sensing a temperature and operating an IGBT by automatically calibrating a temperature sense of a diode to protect a power module of the IGBT for high voltage/high current used to drive a three phase alternating current (AC) control of a motor in eco-friendly electric vehicles.

Description of the Related Art

An existing temperature sensor has a negative temperature coefficient (NTC) type placed on a direct bonded copper (DBC) of an IGBT module. In particular, a temperature of the DBC is approximately equal to a temperature of a cooler (e.g., a heat sink) coupled to a bottom of the DBC. In other words, there is a need to measure a junction temperature of a semiconductor chip that generates heat, however, errors occur when a temperature of the cooler as described above or coolant thereof is monitored.

Therefore, a method has recently been suggested that directly senses a temperature of the IGBT using temperature-turn on voltage characteristics of a diode. For example, a poly-silicon diode is integrated on an IGBT chip to directly sense the junction temperature of the IGBT semiconductor chip. However, since the silicon diode has variation between samples, it is difficult to accurately estimate a temperature thereof, and significant errors occur for each of the samples. Further, when a maximum output is calculated by a thermal model of the IGBT, a maximum current is limited, which limits a maximum output of a motor of an electric vehicle/hybrid vehicle. Additionally, when a current sensor fails or temperature estimation is erroneously performed in an end of life (EOL), driver safety may be compromised or damage to a power module may occur.

The above information disclosed in this section is merely for enhancement of understanding of the background of the invention and therefore it may contain information that does not form the prior art that is already known in this country to a person of ordinary skill in the art.

SUMMARY

The present disclosure provides an IGBT temperature sense circuit having a circuit for automatically calibrating a temperature sense of a diode capable of minimizing error which may occur according to element characteristics of a temperature sense diode, more accurately sensing a temperature, and alleviating a limit of a maximum current (e.g., increasing the maximum current) of an output of an IGBT.

According to an exemplary embodiment of the present disclosure, a temperature sense circuit may include an automatic calibrator configured to automatically determine a supply current of a current source to supply a current to a diode and a diode temperature sensor configured to measure a voltage of one side terminal of the diode according to the current of the diode based on a change of a temperature and adjust an operation of a protection object device.

The diode may be a temperature sense diode embedded in an insulated-gate bipolar transistor (IGBT) chip as the protection object device. The temperature sense circuit may be configured to adjust an operation of the IGBT chip by measuring a temperature of the IGBT chip using the temperature sense diode. The diode may include a plurality of diodes of a series or parallel combination. The turn-on voltage characteristics of the diode for each of temperatures may have an offset for each of samples of the diode, when the diode temperature sensor measures the voltage of one side terminal of the diode, the voltage of one side terminal of the diode may be measured when the offset for each of samples of the diode is adjusted by the setting of the supply current of the current source in the automatic calibrator.

The automatic calibrator may be configured to determine the supply current to be greater than a reference current when a turn-on voltage of the diode is less than a reference value at a predetermined temperature and may be configured to determine the supply current to be less than the reference current when the turn-on voltage of the diode is greater than the reference value at the predetermined temperature for each of samples of the diode.

The automatic calibrator may include a controller configured to gradually increase the supply current of the current source and supply the current to the diode. A comparator may be configured to compare the voltage of one side terminal of the diode with a reference voltage to generate a digital decision voltage, and the controller may be configured to determine whether the supply current of the current source is fixed based on the digital decision voltage. The automatic calibrator may further include a reference voltage generating circuit of a form of a band gap reference chip configured to generate the reference voltage. The automatic calibrator may further include a D-flip flop coupled between the controller and the comparator. The D-flip flop may be configured to receive a direct current (DC) voltage at an input of a D terminal, receive the digital decision voltage at an input of a clock signal terminal, and output an output of a Q terminal to the controller.

According to another exemplary embodiment of the present disclosure, a method for operating a temperature sense circuit may include automatically determining, by the controller, a supply current of a current source to supply a current to a diode and measuring, by the controller, a voltage of one side terminal of the diode according to the current of the diode based on a change of a temperature and adjusting, by the controller, an operation of a protection object device. The diode may be a temperature sense diode embedded in an insulated-gate bipolar transistor (IGBT) chip as the protection object device and may be configured to adjust an operation of the IGBT chip by measuring a temperature of the IGBT chip using the temperature sense diode. The diode may include a plurality of diodes of a series or parallel combination.

The turn-on voltage characteristics of the diode for each of temperatures having an offset for each of samples of the diode may include when the voltage of one side terminal of the diode is measured, the voltage of one side terminal of the diode may be measured when the offset for each of samples of the diode is adjusted after determination of the supply current of the current source. For each of samples of the diode, the supply current may be set to be greater than a reference current when a turn-on voltage of the diode is less than a reference value at a predetermined temperature. The supply current may be set to be less than the reference current when the turn-on voltage of the diode is greater than the reference value at the predetermined temperature.

The automatic determination of the supply current of the current source may include performing an adjustment to gradually increase the supply current of the current source and supply the current to the diode, comparing, by the controller, the voltage of one side terminal of the diode with a reference voltage to generate a digital decision voltage, and determining, by the controller whether the supply current of the current source is fixed based on the digital decision voltage. The reference voltage may be generated using a reference voltage generating circuit of a form of a band gap reference chip. Whether the supply current of the current source is fixed may be determined based on an output of a Q terminal of a D-flip flop that receives the digital decision voltage at an input of a clock signal terminal thereof and receives a DC voltage at an input of a D terminal thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
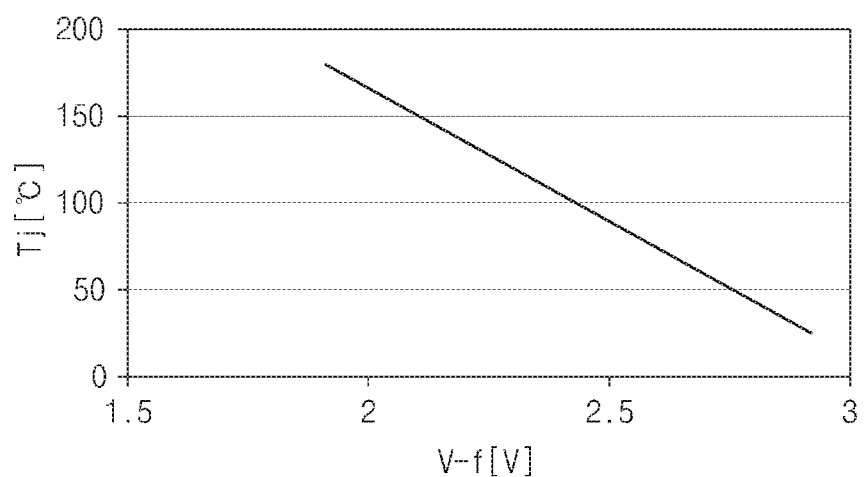
FIG. 1 is an exemplary graph for turn-on voltage characteristic for each of temperatures of a general diode according to the related art.

Hereinafter, the present disclosure will be described in detail with reference to the accompanying drawings. Here, like reference numerals denote like elements in the respective drawings. In addition, a detailed description of functions and/or configurations which are already known will be omitted. The contents disclosed below mainly describe portions necessary to understand operations according to various exemplary embodiments and a description of elements which may obscure the gist of the description will be omitted. In addition, some components shown in the drawings may be exaggerated, omitted or schematically illustrated. The size of each component does not exactly reflect its real size and accordingly, the contents described in this specification are not limited by relative sizes or intervals of the components illustrated in the respective drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

A method for an IGBT temperature sensing will be described in further detail. FIG. 1 is an exemplary graph that illustrates turn-on voltage characteristic for each of temperatures of a general diode. As illustrated in FIG. 1, a turn-on voltage (V-F) of a temperature sense diode DD which may be embedded in an IGBT chip has an inverse proportion relationship with a junction temperature (Tj) of an IGBT. Therefore, the Tj of the IGBT may be estimated by monitoring the turn-on voltage (V-F) of the temperature sense diode DD based on a change of a temperature.

Figure 2:
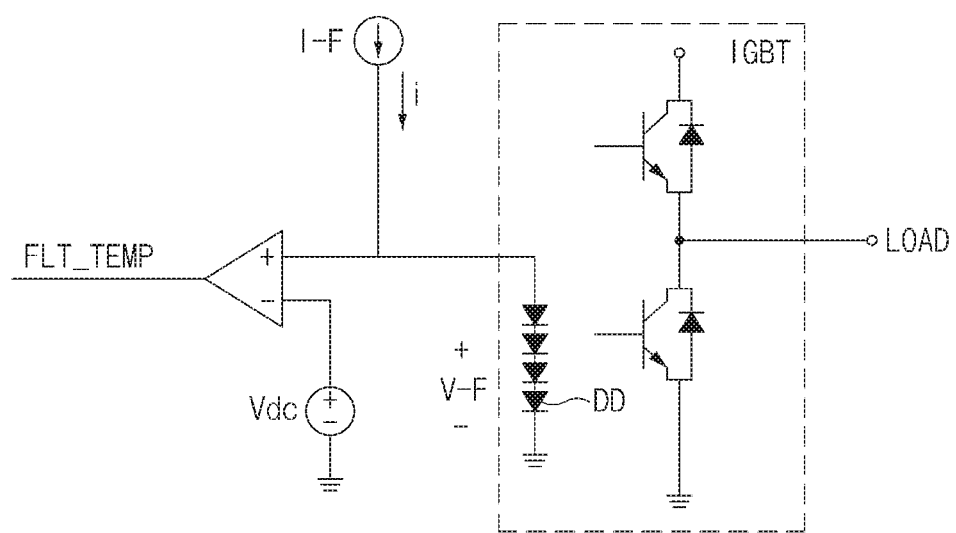
FIG. 2 is an exemplary diagram illustrating a general IGBT temperature sense circuit according to the related art.

FIG. 2 is an exemplary diagram illustrating a general IGBT temperature sense circuit. As illustrated in FIG. 2, when the temperature sense diode DD is embedded in the IGBT chip, an over-temperature protection of the IGBT may occur using an external current source (I-F), an output (FLT_TEMP) of a comparator, and the like. The temperature sense diode DD may be turned on by a constant current source I-F embedded in the circuit and the turn-on voltage V-F thereof may be determined. A value of the turn-on voltage V—F based on the temperature may be applied to a positive (+) input terminal of the comparator. In addition, a direct current (DC) voltage (Vdc) may be input to a negative (−) input terminal of the comparator. Magnitude of the DC voltage Vdc may be appropriately determined based on an over-temperature protection level of the IGBT.

For example, in FIG. 1, when the DC voltage Vdc having the magnitude of about 2.2V is applied, a V-F value may be about 2.7V when the Tj is a room temperature, which may be greater than the over-temperature protection level. Accordingly, a FLT_TEMP value output may be logical high. When Tj increases to about 150° C. or greater, V-F may be 2.2V or less. In particular, when V-F has a voltage less than the DC voltage Vdc of 2.2V the FLT_TEMP value may be output logical low. A FLT_TEMP signal may be monitored by a controller such as a micro-computer (Mi-COM), or the like. Accordingly, an output current of the IGBT may be limited or the IGBT may be turned-off, to protect a power module from a thermal destruction. However, since a silicon diode may have a variation between samples, estimation of an accurate a temperature may be difficult and an error for each of the samples may be substantial. Due to the above-mentioned reason, when a maximum output is calculated by considering a thermal model of the IGBT, a maximum current may be limited, which may limit a maximum output of a motor of an electric vehicle/hybrid vehicle. Additionally, when a current sensor fails or temperature erroneously performance an estimate in an end of life (EOL) calculation driver safety may be compromised and damage to a power module may occur.

Hereinafter, an IGBT temperature sense circuit according to the present disclosure for protecting a power module using the IGBT for high voltage/high current used to drive a three phase alternating current (AC) control of a motor in eco-friendly electric vehicles such as hybrid electric vehicle (HEV)/electric vehicle (EV)/fuel cell electric vehicle (FCEV) by solving the above-mentioned problem will be described. The IGBT temperature sense circuit according to the present disclosure more accurately senses a temperature and may be configured to operate the IGBT by automatically calibrating a temperature sense of the temperature sense diode DD embedded in the IGBT chip. The IGBT temperature sense circuit may include a circuit for automatically calibrating the temperature sense of the diode to minimize error which may occur based on element characteristics of the temperature sense diode DD, more accurately sensing the temperature, and alleviating a limit of a maximum current (e.g., increasing the maximum current) of an output of the IGBT.

Figure 3A:
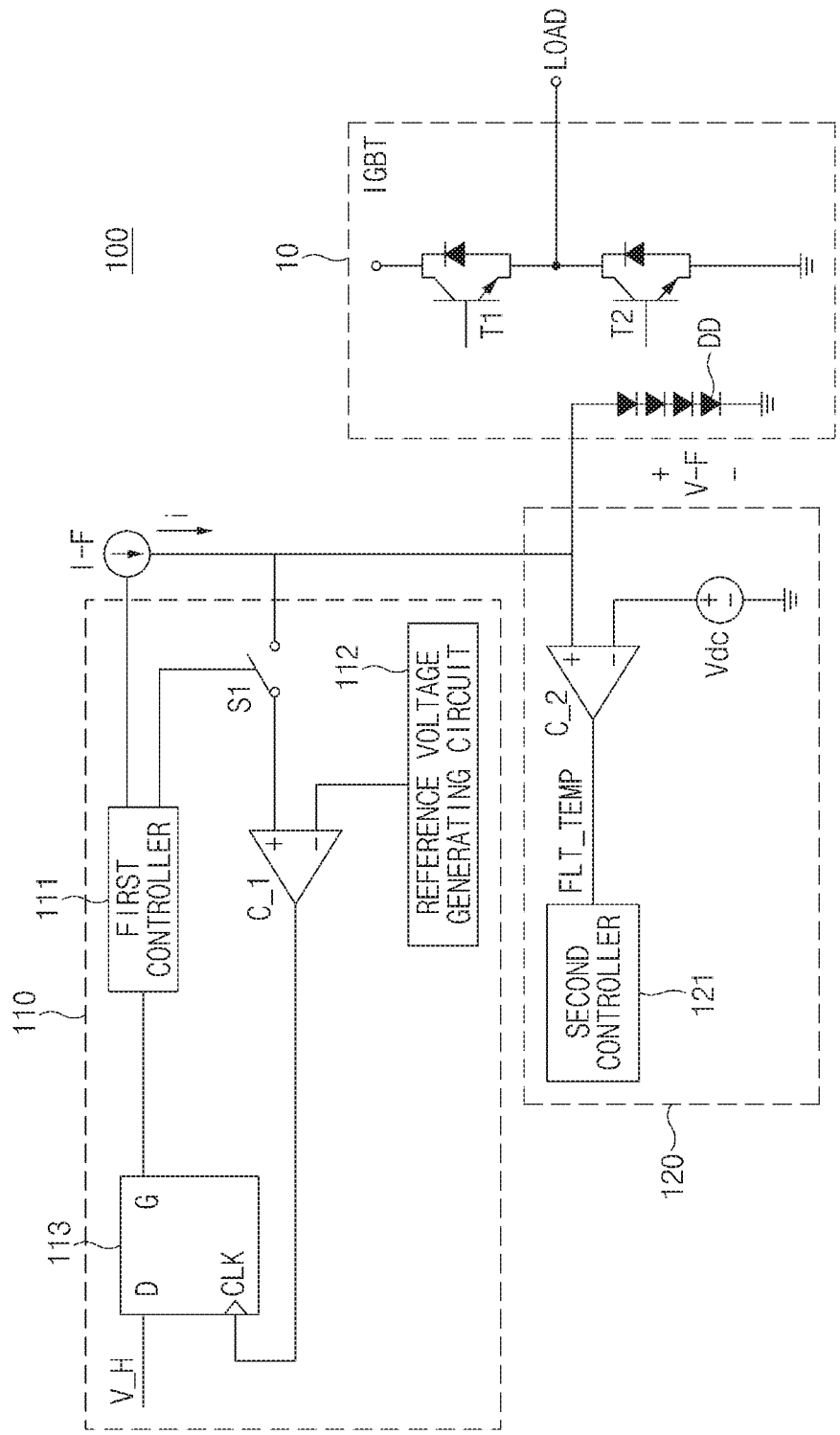
FIG. 3A is an exemplary diagram illustrating an IGBT temperature sense circuit according to an exemplary embodiment of the present disclosure.

FIG. 3A is an exemplary diagram illustrating an IGBT temperature sense circuit according to an exemplary embodiment of the present disclosure. Referring to FIG. 3A, the IGBT temperature sense circuit according to an exemplary embodiment of the present disclosure may include an automatic calibrator 110 configured to automatically determine a supply current of the current source (I-F) supplied to a current to the temperature sense diode DD of the IGBT and a diode temperature sensor 120 configured to measure a voltage of one side terminal of the diode based on a current of the temperature sense diode DD of the IGBT depending on a change of a temperature to t adjust an operation of a protection object device, that is, an IGBT chip 10. The IGBT chip 10 may be implemented in a form of a group of elements including a plurality of IGBT elements T1 and T2.

A temperature of the IGBT chip 10 may be configured to be measured using the temperature sense diode DD in the IGBT temperature sense circuit according to the present disclosure. Accordingly, the operation (e.g., a turn-on/turn-off, an adjustment of an output current, or the like) of the IGBT chip may be adjusted. In particular, a driving range of the IGBT chip 10 may be expanded to alleviate the limit of the maximum current (e.g., increase the maximum current) of the output. For example, the temperature sense diode DD may be a temperature sense diode embedded in the IGBT chip 10 and the temperature sense diode DD may include a plurality of diodes of a series or parallel combination. The temperature sense diode DD may exhibit different turn-on voltage characteristics of a diode for each of the temperatures per a sample based on an environment of a process of manufacturing the same.

Figure 4:
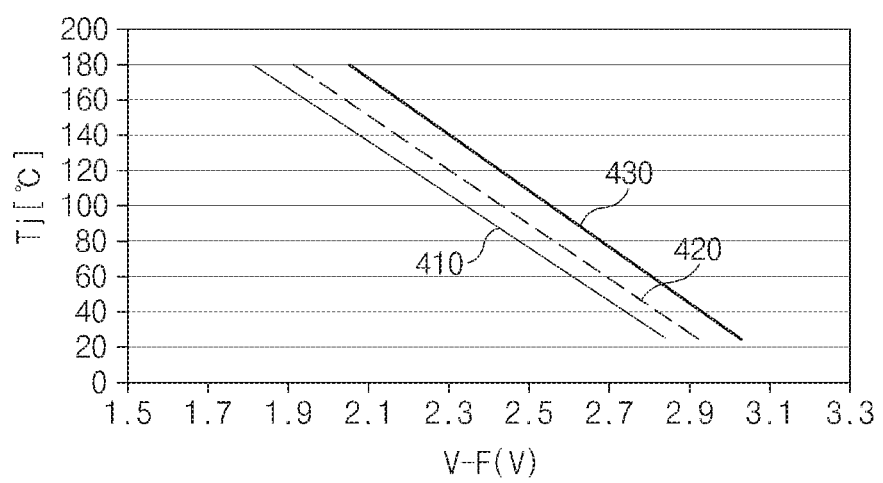
FIG. 4 is an exemplary graph illustrating turn-on voltage characteristics of a temperature sense diode for each of temperatures having an offset for each of samples of the temperature sense diode.

Accordingly, the turn-on voltage characteristics of the diode DD for each of temperatures (e.g., or temperature-turn-on voltage characteristics of the diode) may include an offset for each of samples of the temperature sense diode DD (see FIG. 4). In particular, when the diode temperature sensor 120 measures a voltage of one side terminal of the temperature sense diode DD (e.g., a contact between the current source I-F and the temperature sense diode DD) the voltage of one side terminal of the temperature sense diode DD may be measured. Further, the offset for each of samples of the temperature sense diode DD may be adjusted by setting the supply current of the current source I-F by the automatic calibrator 110. For example, for each of samples of the temperature sense diode DD, the automatic calibrator 110 may be configured to determine the supply current to be greater than a reference current when the turn-on voltage of the temperature sense diode DD is less than a reference value at a predetermined temperature. The supply current may be determined to be less than the reference current when the turn-on voltage of the temperature sense diode DD is greater than the reference value at the predetermined temperature. Accordingly, an offset of a measured voltage may occur when measuring a voltage of the diode DD of the diode temperature sensor 120 to be zero (0) (e.g., or allow an offset of a temperature for each of samples/driving current to be zero).

The automatic calibrator 110 may include a first controller 111, a switch S1, a comparator C_1, a reference voltage generating circuit 112, a D-flip flop 113. The first controller 111 may be configured to adjust the supply current i when the current source I-F is initially and gradually increase and the corresponding current i may be supplied to the diode DD. The comparator C_1 may be configured to compare the voltage of one side terminal of the diode DD with the reference voltage to generate a digital decision voltage (e.g., logical high/low). The switch S1 may be configured to be adjusted by the first controller 111 to connect one side terminal of the temperature sense diode DD (e.g., a contact between the current source I-F and the temperature sense diode DD) to a positive (+) input terminal of the comparator C_1 until the supply current of the current source I-F is fixed. The reference voltage generating circuit 112 may form of a band gap reference chip that may be configured to generate the reference voltage and apply the reference voltage to a negative (−) input terminal of the comparator C_1.

The first controller 111 may be configured to determine whether the supply current of the current source I-F is fixed based on the digital decision voltage output from the comparator C_1. In other words, when the supply current i of the current source I-F is increased the voltage applied to the positive (+) input terminal of the comparator C_1 may be greater than the reference voltage output from the reference voltage generating circuit 112, an output of the comparator C_1 may be adjusted from the logical low to the logical high. Accordingly, thereafter, the first controller 111 may be configured to fix the supply current (i) of the corresponding current source I-F and turn-off the switch S1 to be opened. In particular, the D-flip flop 113 may be coupled between the first controller 111 and the comparator C_1. In other words, the D-flip flop 113 may be configured to receive a DC voltage V_H at an input of a D terminal and receive the digital decision voltage of the comparator C_1 at an input of a clock CLK signal terminal to output an output of a Q terminal to the first controller 111. The diode temperature sensor 120 may include a second comparator C_2 configured to compare the voltage of one side terminal of the temperature sense diode DD input to a positive (+) terminal with the DC voltage Vdc input to a negative (−) terminal to output a digital comparison result FLT_TEMP. A second controller 121 may be configured to adjust an operation (e.g., a turn-on/turn-off, an adjustment of an output current, or the like) of the IGBT chip 10 based on the digital comparison result FLT_TEMP.

Figure 3B:
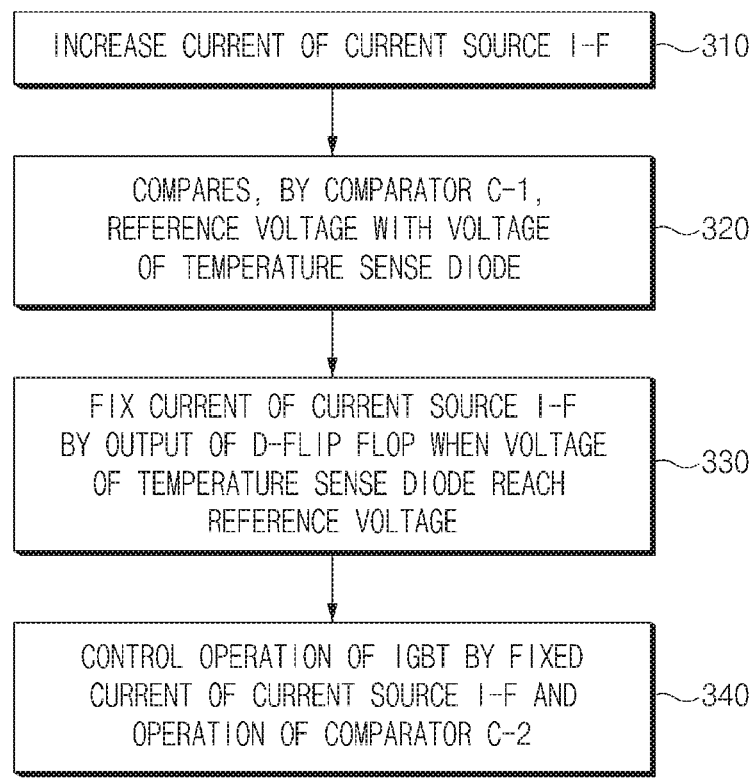
FIG. 3B is an exemplary flowchart illustrating an operation of the IGBT temperature sense circuit according to an exemplary embodiment of the present disclosure.

Hereinafter, an operation of the IGBT temperature sense circuit according to an exemplary embodiment of the present disclosure will be described in more detail with reference to the exemplary flowchart of FIG. 3B. First, when power is supplied to the IGBT temperature sense circuit, the first controller 111 may be configured to supply the current i of the current source I-F to the diode DD and gradually increase the current i (310). The first controller 111 may be configured to turn on the switch S1 while an adjustment of a controller occurs to gradually increase supply current i of the current source I-F that flows into the diode DD and apply the voltage V-F of one side terminal of the diode DD to the positive (+) terminal of the comparator C_1.

The reference voltage generating circuit 112 of a form of a band gap reference chip may be configured to generate the reference voltage and apply the reference voltage to the negative (−) input terminal of the comparator C_1. The comparator C_1 may be configured to compare the voltage V-F of one side terminal of the diode DD with the reference voltage to generate a digital decision voltage (e.g., logical high/low) (320). An initial output of the comparator C_1 may be the logical low. The band gap reference may be an analog circuit block to output a constant voltage regardless of an offset such as an ambient temperature, an environment of a manufacturing process, or the like. The band gap reference may be designed to output a predetermined ideal voltage (e.g., the turn-on voltage V-F of the diode DD) at a room temperature.

The voltage V-F of one side terminal of the diode DD may be gradually increased on voltage-current characteristics of the diode DD as the supply current i is increased. When the voltage V-F of the diode DD reaches the reference voltage of the reference voltage generating circuit 112, the output of the comparator C_1 may be adjusted to the logical high (330). When the output of the comparator C_1 is changed to the logical high, the input of the clock CLK signal terminal of the D-flip flop 113 may be triggered to the logical high, and the output Q of the D-flip flop 113 may output the DC voltage V_H to the first controller 111. Thereafter, the first controller 111 configured to receive the DC voltage V_H may be configured to stop the increase of the supply current i, fix the supply current i to the corresponding current, and turn off the switch S1 to be opened. Thereafter, when the fixed supply current i, is in the diode temperature sensor 120, the second comparator C_2 may be configured to compare the voltage of one side terminal of the temperature sense diode DD input to a positive (+) terminal thereof with the DC voltage Vdc input to a negative (−) terminal thereof to output a digital comparison result FLT_TEMP. The second controller 121 may be configured to adjust an operation (e.g., a turn-on/turn-off, an adjustment of an output current, or the like) of the IGBT chip 10 based on the digital comparison result FLT_TEMP (340).

According to the present disclosure, as illustrated in FIG. 4, the turn-on voltage characteristics of the diode DD for each of temperatures having the offset for each of samples of the temperature sense diode DD may include when the diode temperature sensor 120 measures the voltage of one side terminal of the temperature sense diode DD (e.g., a contact between the current source I-F and the temperature sense diode DD), the voltage of one side terminal of the temperature sense diode DD may be measured when the offset for each of samples of the temperature sense diode DD is adjusted by setting the supply current of the current source I-F by the automatic calibrator 110.

For example, for each of samples of the temperature sense diode DD, the automatic calibrator 110 may be configured to determine the supply current i to be greater than a reference current when the turn-on voltage of the temperature sense diode DD is less than a reference value at a predetermined temperature (see 410 of FIG. 4) and may be configured to determine the supply current i to be less than the reference current when the turn-on voltage of the temperature sense diode DD is greater than the reference value at the predetermined temperature (see 430 of FIG. 4). Accordingly, an offset of a measured voltage when measuring a voltage of the diode DD of the diode temperature sensor 120 may be zero (0) (or allow an offset of a temperature for each of samples/driving current to be zero). In other words, the control characteristics 410 and 430 of diodes having the offset may be converted into reference characteristics 420 such as 420 of FIG. 4.

The above-mentioned band gap reference will be described in more detail as follows. The band gap reference may be a circuit configured to generate a reference voltage independent from process-voltage-temperature (PVT) variation which is typically called complementary-to-absolute-temperature (CTAT). Generally, the band gap reference may be used to generate the reference voltage in an integrated circuit (IC). A configuration thereof may be slightly different since requirement conditions such as noise, a frequency, an operation voltage, and the like are different depending on applications. The band gap reference according to the present disclosure may include all circuits generating a constant reference voltage (e.g., a DC voltage) independent from the temperature or a degree of an influence of a process. The band gap reference according to the present disclosure may have an IC form and may also be a circuit implemented within the first controller 111 of a form such as a micom of a predetermined circuit board.

Figure 5A:
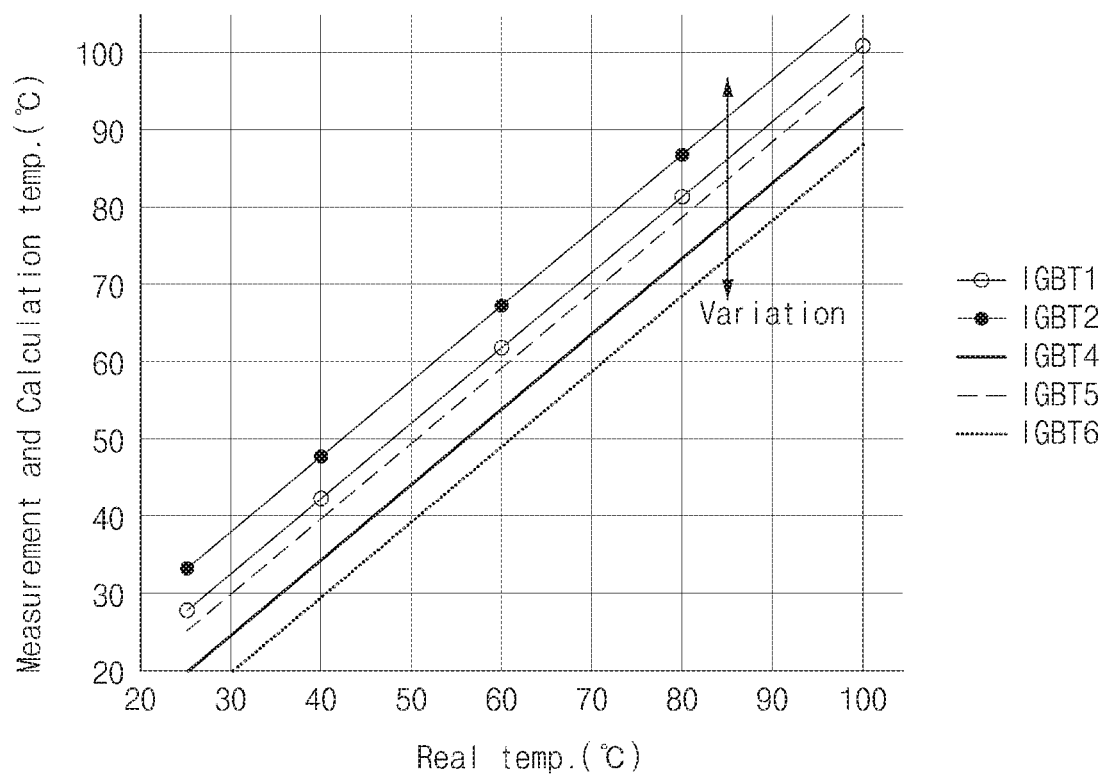
FIG. 5A is an exemplary graph illustrating a relationship between a real temperature of the temperature sense diode of the IGBT before applying the IGBT temperature sense circuit according to the present disclosure and a measurement/calculation temperature.
Figure 5B:
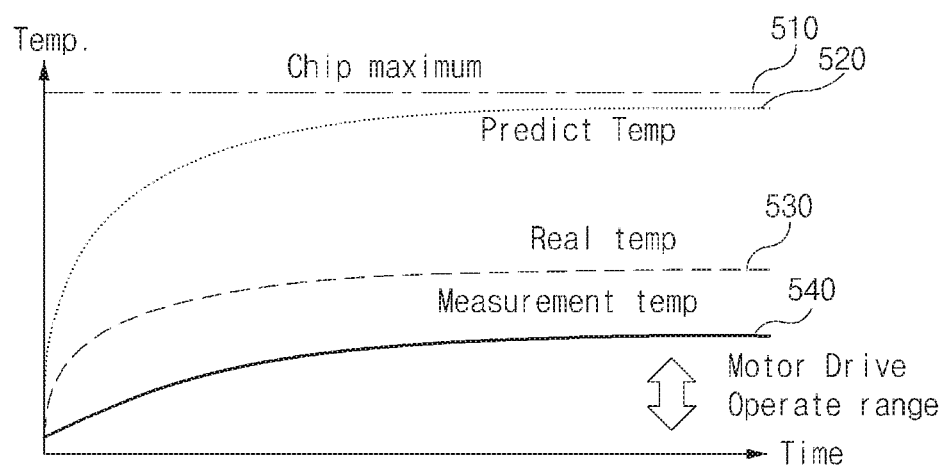
FIG. 5B is an exemplary graph illustrating an operation range of a motor driving of a vehicle based on a result of FIG. 5A.

FIG. 5A is an exemplary graph illustrating a relationship between a real temperature of the temperature sense diode of the IGBT before applying the IGBT temperature sense circuit and a measurement/calculation temperature. FIG. 5B is an exemplary graph illustrating an operation range of a motor driving of a vehicle based on a result of FIG. 5A. As illustrated in FIG. 5A, an offset between a real temperature 530 of the temperature sense diode and a measurement/calculation temperature 540 may be increased in several samples IGBT1 to IGBT6 prior to applying the IGBT temperature sense circuit.

Accordingly, as illustrated in FIG. 5B, prior to applying the IGBT temperature sense circuit, since the temperature sense diode may be operated below a maximum temperature 510 and a prediction temperature 520 on a standard and may exhibit the corresponding temperature 530. A motor drive operation region may be configured to exhibit the measurement temperature 540 while having a margin from the corresponding temperature 530. The motor drive operation region may be minimal when the IGBT is used to drive a three-phase alternating current (AC) control of a motor in eco-friendly electric vehicles such as HEV/EV/FCEV.

Figure 5C:
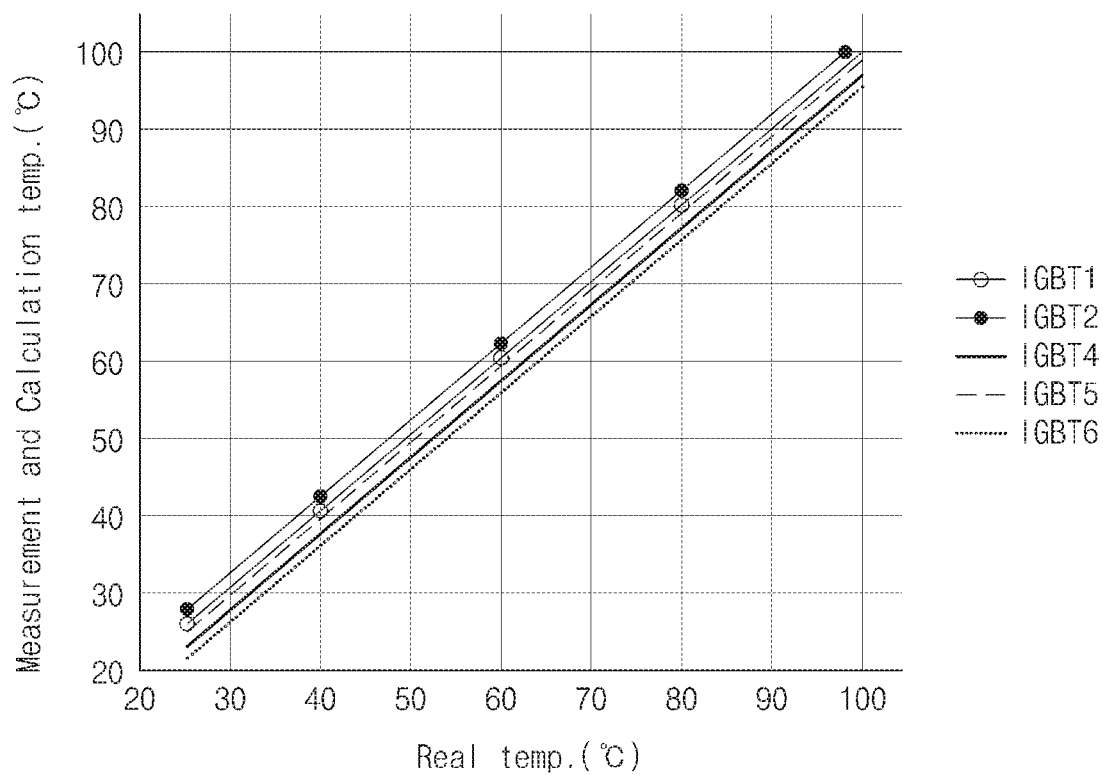
FIG. 5C is an exemplary graph illustrating a relationship between a real temperature of the temperature sense diode of the IGBT after applying the IGBT temperature sense circuit according to the present disclosure and a measurement/calculation temperature.
Figure 5D:
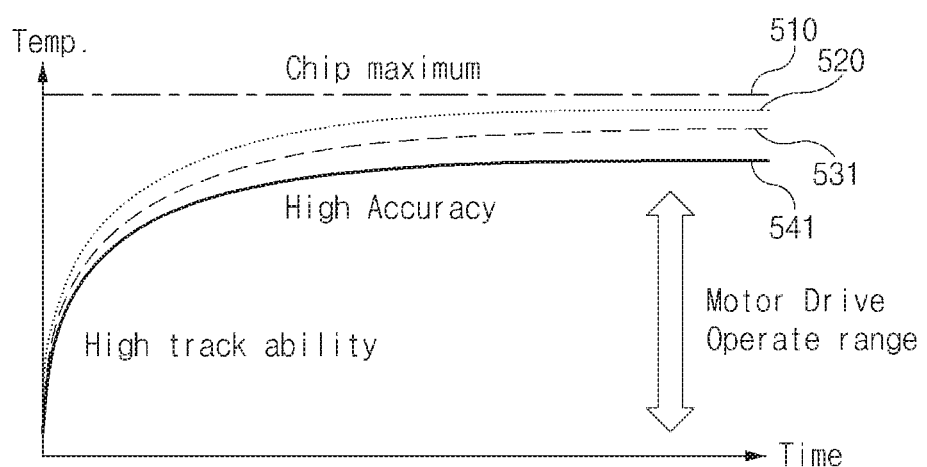
FIG. 5D is an exemplary graph illustrating an operation range of a motor driving of a vehicle based on a result of FIG. 5C.

FIG. 5C is an exemplary graph illustrating a relationship between a real temperature of the temperature sense diode of the IGBT after applying the IGBT temperature sense circuit according to the present disclosure and a measurement/calculation temperature. FIG. 5D is an exemplary graph illustrating an operation range of a motor driving of a vehicle based on a result of FIG. 5C. As illustrated in FIG. 5C, the offset between the real temperature 530 of the temperature sense diode and the measurement/calculation temperature 540 may be minimized in several samples IGBT1 to IGBT6 after applying the IGBT temperature sense circuit to an IGBT power module.

Accordingly, as illustrated in FIG. 5D, after applying the IGBT temperature sense circuit to the IGBT power module, the temperature sense diode may be configured to operate without having a significant difference from the maximum temperature 510 and the prediction temperature 520 on the standard and exhibits the corresponding temperature 531. Further a motor drive operation region may be determined to exhibit a measurement temperature 541 while having a minimized margin from the corresponding temperature 531. The motor drive operation region may be increased when the IGBT is used to drive a three-phase alternating current (AC) control of a motor in eco-friendly electric vehicles such as HEV/EV/FCEV.

As described above, according to the exemplary embodiments of the present disclosure, in the IGBT temperature sense circuit, when sensing the temperature using the temperature sense diode formed on the IGBT chip, the offset for each of the samples may occur based on the element characteristics of the temperature sense diode that may be minimized to allow the temperature to be precisely sensed. Accordingly, the limit of the maximum current (increase the maximum current) of the output of the IGBT may be removed.

In particular, when applying to a motor driven inverter, or the like of the electric car such as the hybrid electric vehicle (HEV), the electric vehicle (EV), the fuel cell electric vehicle (FCEV), or the like, thermal destruction of the power module may be prevented by a stable over-temperature protection of the power module of the IGBT. The safety and convenience of the driver may be improved. Further, when applying to the motor driven inverter, or the like of the electric car, a range of the maximum output current of the motor may be expanded and the maximum output of the motor may be increased.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims

What is claimed is:
1. A temperature sense circuit, comprising:
an automatic calibrator configured to supply current of a current source to a current to a diode; and
a diode temperature sensor configured to measure a voltage of one side terminal of the diode according to the current of the diode based on a change of a temperature and adjustment of an operation of a protection object device,
wherein the automatic calibrator includes:
a reference voltage generation circuit of a form of a hand gap reference chip configured to generate a reference voltage;
a controller configured to supply current of the current source that is gradually increased and the corresponding current is supplied to the diode; and
a comparator configured to compare the voltage of one side terminal of the diode with the reference voltage to generate a digital decision voltage, and
wherein the controller is configured to determine whether the supply current of the current source is fixed based on the digital decision voltage.

2. The temperature sense circuit according to claim 1, wherein the diode is a temperature sense diode embedded in an insulated-gate bipolar transistor (IGBT) chip as the protection object device, and
wherein the temperature sense circuit is configured to determine an operation of the IGBT chip by measuring a temperature of the IGBT chip using the temperature sense diode.

3. The temperature sense circuit according to claim 1, wherein the diode temperature sensor is configured to measure the voltage of one side terminal of the diode for turn-on voltage characteristics of the diode for each of temperatures having an offset for each of samples of the diode, and
wherein the voltage of one side terminal of the diode is measured when the offset for each of samples of the diode is adjusted by setting the supply current of the current source in the automatic calibrator.

4. The temperature sense circuit according to claim 1, wherein the automatic calibrator is configured to adjust the supply current to be greater than a reference current when a turn-on voltage of the diode is less than a reference value at a predetermined temperature, and configured to adjust the supply current to be less than the reference current when the turn-on voltage of the diode is greater than the reference value at the predetermined temperature, for each of samples of the diode.

5. The temperature sense circuit according to claim 1, wherein the automatic calibrator further includes a D-flip flop coupled between the controller and the comparator, and the D-flip flop is configured to receive a direct current (DC) voltage at an input of a D terminal, receive the digital decision voltage at an input of a clock signal terminal, and output an output of a Q terminal to the controller.

6. The temperature sense circuit according to claim 1, wherein the diode includes a plurality of diodes having a series or parallel combination.

7. A method for operating a temperature sense circuit, comprising:

automatically determining, by a controller a supply current of a current source to supply a current to a diode; and measuring, by the controller a voltage of one side terminal of the diode based on the current of the diode depending on a change of a temperature and adjusting an operation of a protection object device, wherein the automatically setting of the supply current of the current source includes:

performing, by the controller, an adjustment to gradually increase the supply current of the current source and to supply the current to the diode;

comparing, by the controller, the voltage of one side terminal of the diode with a reference voltage to generate a digital decision voltage, and determining, by the controller, whether the supply current of the current source is fixed based on the digital decision voltage, and wherein the reference voltage is generated by a reference voltage generation circuit of a form of a band gap reference chip.

8. The method according to claim 7, wherein the diode is a temperature sense diode embedded in an insulated-gate bipolar transistor (IGBT) chip as the protection object device, and the method adjusts an operation of the IGBT chip by measuring a temperature of the IGBT chip using the temperature sense diode.

9. The method according to claim 7, wherein turn-on voltage characteristics of the diode for each of temperatures having an offset for each of samples of the diode, when the voltage of one side terminal of the diode is measured, the voltage of one side terminal of the diode is measured when the offset for each of samples of the diode is adjusted after the setting of the supply current of the current source.

10. The method according to claim 7, wherein for each of samples of the diode, the supply current is set to be greater than a reference current when a turn-on voltage of the diode is less than a reference value at a predetermined temperature, and the supply current is set to be less than the reference current when the turn-on voltage of the diode is greater than the reference value at the predetermined temperature.

11. The method according to claim 7, wherein in the determining of whether the supply current of the current source is fixed, whether the supply current of the current source is fixed is determined based on an output of a Q terminal of a D-flip flop that receives the digital decision voltage at an input of a clock signal terminal thereof and receives a DC voltage at an input of a D terminal thereof.

12. The method according to claim 7, wherein the diode includes a plurality of diodes of a series or parallel combination.

* * * * *